United States Patent [19]

Hønstvet et al.

[11] Patent Number: 5,092,170
[45] Date of Patent: Mar. 3, 1992

[54] MEASUREMENT OF MASS OF FLUID IN A CONTAINER

[75] Inventors: Ian A. Hønstvet; Mark S. Kendrew, both of Stevenage, United Kingdom

[73] Assignee: British Aerospace Public Limited Company, London, United Kingdom

[21] Appl. No.: 520,452

[22] Filed: May 8, 1990

[30] Foreign Application Priority Data

May 12, 1989 [GB] United Kingdom ............... 8910999

[51] Int. Cl.⁵ .......................... G01F 23/22; B64G 1/00
[52] U.S. Cl. ........................................ 73/295; 73/149; 244/158 R; 374/54
[58] Field of Search ................... 73/295, 149; 374/45, 374/54; 244/158 R

[56] References Cited

U.S. PATENT DOCUMENTS 3,922,658  11/1975  Harper et al. .................... 73/295
3,955,416   5/1976  Waiwood ......................... 73/295
4,729,245   3/1988  Hansman, Jr. .................... 73/149
4,805,454   2/1989  LeVert ............................ 73/295
4,825,383   4/1989  Ory ................................ 73/295
4,898,030   2/1990  Yeh ............................. 244/158 R

FOREIGN PATENT DOCUMENTS 0294911  12/1987  Japan .............................. 73/295

Primary Examiner—William A. Cuchlinski, Jr.
Assistant Examiner—Diego F. F. Gutierrez
Attorney, Agent, or Firm—Young & Thompson

[57] ABSTRACT

The mass of fluid remaining in a container 10 is determined by switching on a series of heating elements 14 and sensing the temperature of the container and contents over a period of time using sensor 16, thereby to deduce the thermal time constant. The thermal time constant is used to determine the mass of the remaining fluid contents from a look-up table or other means. In an alternative arrangement, the thermal response on cooling may be used in a similar manner.

11 Claims, 3 Drawing Sheets

MEASUREMENT OF MASS OF FLUID IN A CONTAINER

This invention relates to methods and apparatus for determining the mass of fluid in a container and in particular, but not exclusively, to determining the mass of liquid propellant remaining in a storage vessel on board a spacecraft.

BACKGROUND OF THE INVENTION

It is well known that a spacecraft includes thrusters for station-keeping in orbit and that these thrusters are supplied from a finite reservoir.

In order to maximise the life of a spacecraft it is important to be able to determine very accurately the mass of propellant remaining at any given instant in time and particularly at the end of life when a small quantity of propellant must be reserved for the final graveyard burn. Traditionally the measurement of the remaining propellant has been accomplished by integrating the predicted propellant consumption for all the liquid propellant gauging and thruster firings over the spacecraft life with check calculations being performed from the tank pressure and temperature telemetry. This method suffers from the fact that the greatest accuracy is found at beginning of life, whilst at end of life, when a high accuracy is most needed, relatively low accuracy is achieved.

Also, of course, what appears as a low percentage error when the vessel is full becomes a much larger percentage error when the tank is nearly empty. In practice this means that the spacecraft often will contain more propellant than is required for its service life and it will still have this usable excess even after the final graveyard burn. Thus an improvement in the accuracy of measurement of the mass of the propellant fluid may provide an increase in the service life and/or a decrease in the mass of fluid loaded at launch. In an earlier proposal, the temperature rise over a fixed period immediately after a tank heater is switched on is detected and related in a linear fashion to the thermal capacity of the system.

SUMMARY OF THE INVENTION

We have designed a mass measurement system believed to provide a significant improvement in accuracy of measurement of the mass of the propellant fluid.

Broadly stated, in one aspect this invention provides a method of determining the mass of fluid remaining in a container which method comprises monitoring the heating or cooling thermal response of said container and/or said fluid to deduce the thermal time constant and using said time constant to determine the mass of fluid remaining.

In another aspect, this invention provides apparatus for determining the mass of fluid remaining in a container, said apparatus comprising temperature sensor means for sensing the temperature of the container and/or the fluid contained therein, and processor means responsive to the output of said temperature sensor means for monitoring the heating or cooling thermal response of the container and/or the fluid to deduce the thermal time constant and using said thermal time constant to determine the mass of fluid remaining.

The invention also extends to spacecraft making use of the method or incorporating apparatus defined above.

BRIEF DESCRIPTION OF THE DRAWINGS

A non-limiting example of the invention will now be described reference being made to the accompanying drawings in which.

DETAILED DESCRIPTION OF THE DRAWINGS

Figure 1:
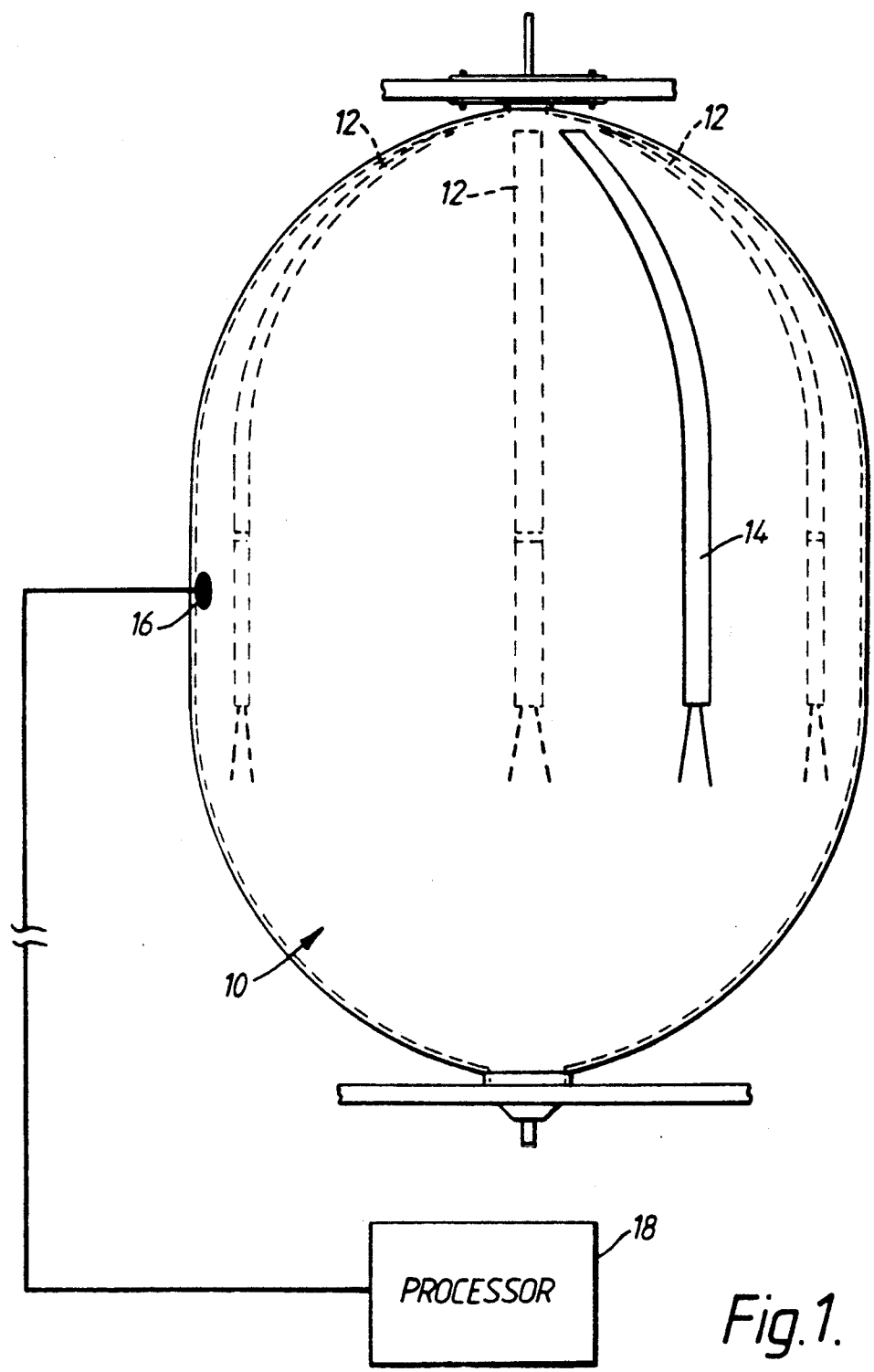
FIG. 1 is a schematic view of a spacecraft propellant storage tank fitted with booster heaters.

FIG. 1 illustrates one of several propellant storage tanks provided on a spacecraft. The tanks are loaded with a given mass of fuel before launch and supply propellant fluid to thrusters (not shown) which maintain the spacecraft in the required attitude and orientation during the service life of the spacecraft and are also used at the end of the service life of the spacecraft to send it on a graveyard burn.

Each storage tank 10 is insulated from the spacecraft structure and has on its surface six high power electric heating elements 12 and two low power electric heating elements 14. In a typical example, the heaters together dissipate not less than 7 watts. A thermistor 16 is attached to the mid portion of the storage tank 10 and provides a signal representing the temperature of the storage tank and its fluid contents. The heater elements 12 and 14 and thermistor 16 are already provided on most conventional spacecraft to adjust the temperature of the storage tank 10 prior to firing of the thruster.

In this example, the thermal response of the tank 20 following switch-on of the heaters 12 and 14 is monitored by a processor 18 which may be on board the spacecraft or supplied with telemetry output at a ground station.

The processor 18 determines the time constant ($\tau$) of the temperature v.s. time characteristic of the storage tank 10 and its fluid contents. We have found that the time constant decreases substantially linearly with the mass of the fluid content so that the mass of fluid contents can be determined once the time constant is known or calculated.

We have developed three different mathematical models from each of which the time constant ($\tau$) may be derived, as follows:

$$\tau = \frac{\frac{T_2 + T_3}{2} - \frac{T_1 + T_2}{2}}{\frac{T_1 - T_2}{t_1 - t_2} - \frac{T_2 - T_3}{t_2 - t_3}} \qquad \text{Equation 1}$$

where $T_1$, $T_2$, $T_3$ are the temperatures of the container and/or fluid at times $t_1$, $t_2$, $t_3$ respectively.

$$\tau = \frac{t(a) - t(b)}{\ln \frac{T_\infty - T(b)}{T_\infty - T(a)}} \qquad \text{Equation 2}$$

where $T_\infty$ is the steady state temperature of the container and/or fluid attained and T(a), T(b) are the temperatures of the container and/or fluid at times t(a),t(b).

$$\tau = \frac{-t}{\ln\left(1 - \frac{T(t) - T_o}{T_\infty - T_o}\right)} \quad \text{Equation 3}$$

where $T_o, T_\infty$ are the initial and steady state temperatures respectively of the container and/or fluid and $T(t)$ is the temperature of the container and/or fluid at time t after start of heating.

It will of course be understood that the time constant ($\tau$) or its equivalent may be calculated or determined by monitoring the temperature of the storage tank in ways other than from one of Equations 1 to 3.

It is possible to determine the time constant at any time after switch-on of the heaters but the accuracy of measurement of the time constant increases with time and it is preferred to wait for at least 8 or 12 hours before the temperature data from thermistor 16 is processed to determine the time constant.

A significant advantage of this system is that the percentage accuracy of the measurement of the time constant—and thus the mass remaining—increases as the mass remaining decreases, so that the measurement technique is most accurate towards the end of the life of the spacecraft when accuracy is most critical.

The spacecraft will experience a diurnal temperature variation which is approximately sinusoidal and which is preferably stripped from the raw temperature data from the thermistor before the time constant is calculated. The variation may be detected and processed to form an adaptive sinusoidal model which is used to strip the sinusoidal diurnal component from the sensed temperature data.

The accuracy of the value determined for time constant depends on the amount of telemetry output and thus the resolution of the digital temperature signal. The data rate can be increased by switching on the heater elements at such a time so that, during the measurement period, the diurnal variation acts to maximise the increase with time of the sensed temperature. In practice, assuming that the measurement period starts 12 hours after switch-on, the heaters should be switched on when the diurnal temperature is at a maximum, so that there is maximum data output in the second twelve hour period after switch-on.

The only first order parameter upon which the time constant is dependent is the fill fraction. Other parameters enter the equations since they are functions of the absolute temperature. The variations of these parameters with temperature are accounted for in the post test data processing software and include:

i) radiative coupling from system to environment ($\alpha T^4$)

ii) specific heat of:
tank + insulation
liquid within the tank
vapour within the tank
cover gas within the tank iii) vapour pressure of the contained liquid iv) latent heat of vapourisation of the contained liquid.

The processor 18 will have a look-up table or other means relating calculated time constant to the mass of the remaining fluid contents or the fill fraction and the relationship may be determined empirically before launch taking account of the above parameters.

The relation between the time constant $\tau$ and the propellant mass is a standard text book relationship and varies from container to container as shown below.

The relationship is:

$$\tau = \frac{\text{Total thermal capacity of container + contents}}{\text{Total thermal coupling from container to environment}}$$

The remaining liquid mass is then related to the total thermal capacity by:

$$\text{Liquid mass} = \frac{\text{Total thermal capacity} - \text{tank thermal capacity}}{\text{Liquid specific heat}}$$

Figure 2:
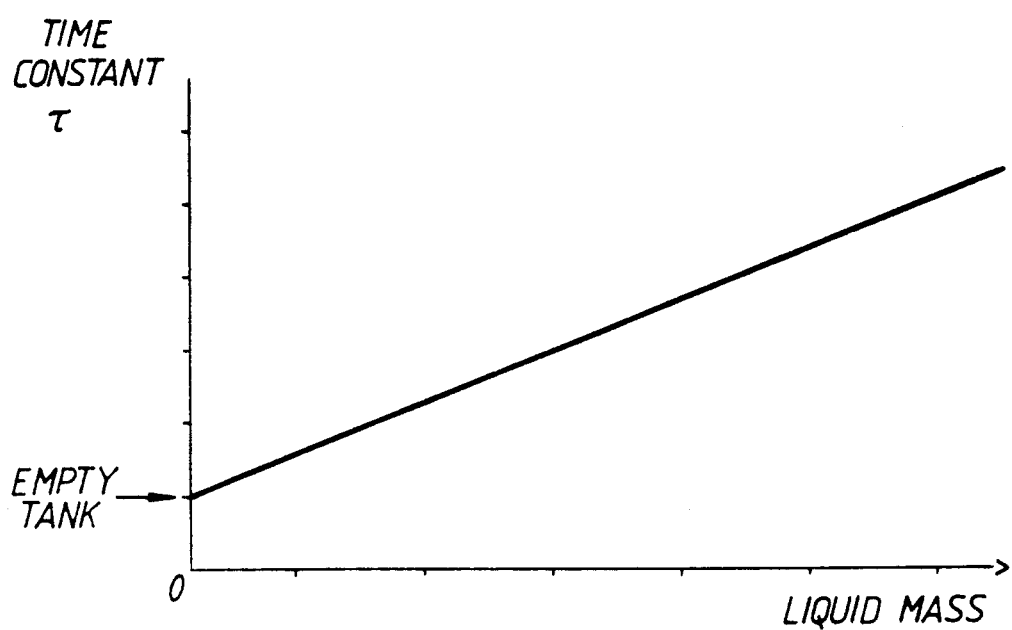
FIG. 2 shows a typical relationship between the time constant and the liquid mass remaining.

From the above two equations it can be seen that the arithmetic relationship between the time constant $\tau$ and the liquid mass is dependent upon a large number of variables e.g. tank mass, tank thermal control, liquid type etc, and FIG. 2 shows a typical relationship between the time constant $\tau$ and the liquid mass remaining. The processor 18 will also, as mentioned above, be able to determine the diurnal temperature variation and provide appropriate compensating data. Our studies show that the exemplary technique disclosed above should be capable of predicting the fuel/oxidant mass to 6% accuracy which is a significant improvement on existing techniques, so that the excess fuel/oxidant required may be significantly reduced with a resultant increase in life or decrease in fuel/oxidant payload.

Another advantage, where there are several fuel and oxidant tanks, is that the technique allows the operator to know the distribution of fuel and oxidant across the tanks. The life of the spacecraft may be further improved by selective tank use to use up all the dynamic residuals (i.e. that usable portion of the fluid as opposed to the unusable static residual). Previously these have not been used as their location is usually unknown. It is also possible to adjust the pressure and temperature in the tanks to preferentially use fuel and oxidant if an excess of either exists, again increasing on-station lifetime.

Figure 3:
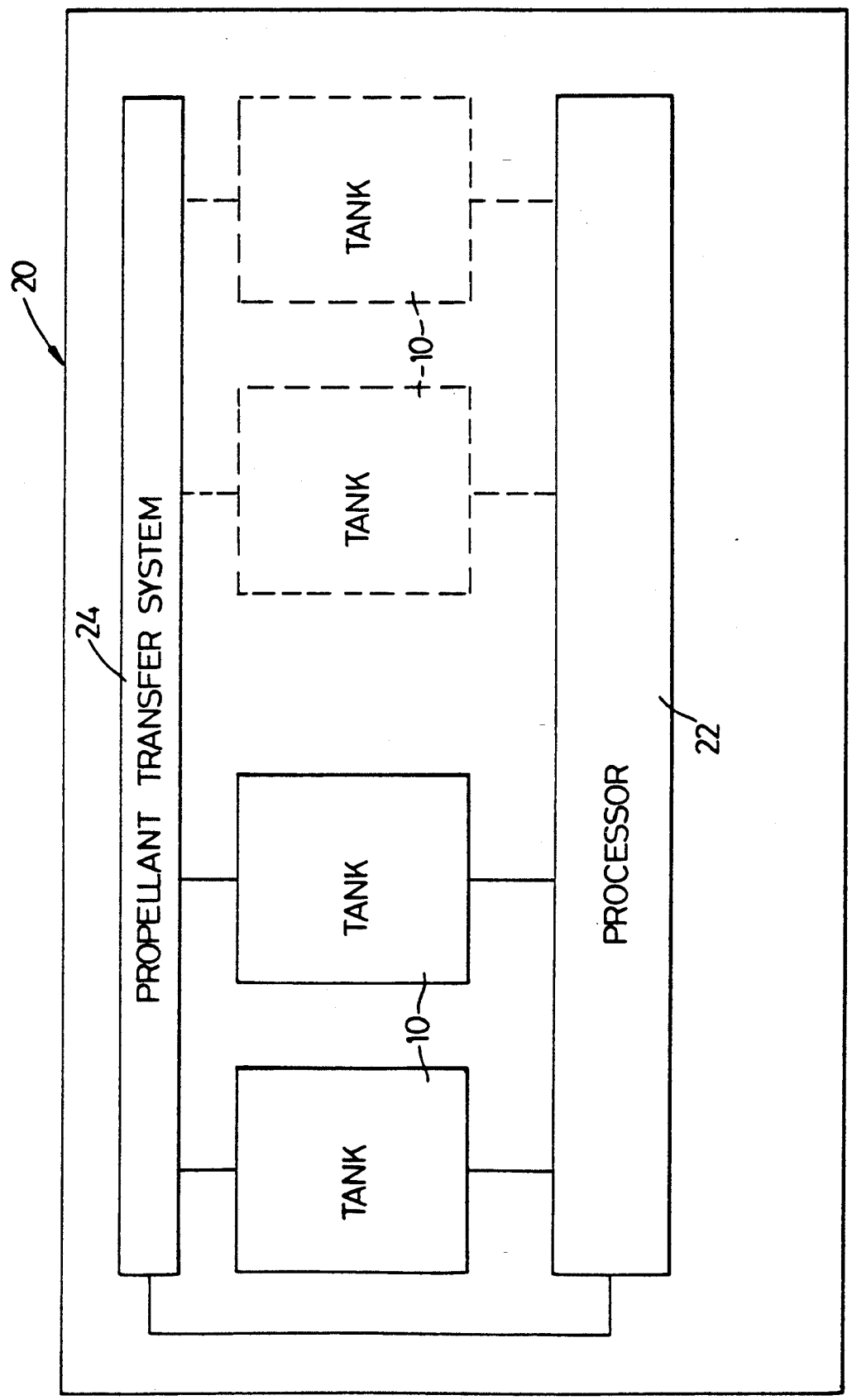
FIG. 3 is a schematic view of a spacecraft fitted with a plurality of propellant storage tanks.

FIG. 3 shows an example of a spacecraft 20 fitted with a plurality of storage tanks 10, a processor 22 for determining the fill fraction of each tank and a system 24 for transferring propellant from one tank to the other on the basis of the fill fractions determined by the processor 22.

We claim:

1. A method of determining the mass of fluid remaining in a container, which method comprises the steps of:
   heating the container,
   detecting and measuring the temperature of the container and any fluid contained therein,
   deducing a temperature vs. time curve for the container and any fluid therein,
   devising from said curve the thermal time constant of said curve, and
   using said thermal time constant to determine the mass of fluid remaining in said container.

2. A method according to claim 1, wherein said time constant ($\tau$) is deduced substantially in accordance with the following formula:

$$\tau = \frac{\frac{T_2 + T_3}{2} - \frac{T_1 + T_2}{2}}{\frac{T_1 - T_2}{t_1 - t_2} - \frac{T_2 - T_3}{t_2 - t_3}}$$

where $T_1$, $T_2$, $T_3$ are temperatures of the container and any fluid therein at times $t_1$, $t_2$, $t_3$ respectively.

3. A method according to claim 1, wherein said time constant ($\tau$) is deduced substantially in accordance with the following formula:

$$\tau = \frac{t(a) - t(b)}{\ln \frac{T\infty - T(b)}{T\infty - T(a)}}$$

where $T\infty$ is the steady state temperature attained by the container and any fluid therein and $T(a)$, $T(b)$ are the temperatures of the container and any fluid therein at times $t(a)$, $t(b)$.

4. A method according to claim 1, wherein said time constant ($\tau$) is deduced substantially in accordance with the following formula:

$$\tau = \frac{-t}{\ln 1 - \frac{(T(t) - To)}{(T\infty - To)}}$$

where $To$, $T\infty$ are the initial and steady state temperatures respectively of the container and any fluid therein and $T(b)$ is the temperature of the container and any fluid therein at time $t$ after start of heating.

5. A method according to claim 1, wherein the container is mounted on a spacecraft and contains a propellant fluid.

6. A method according to claim 1, wherein the thermal time constant is derived from values on said temperature vs. time curve after a preset period following start of said heating.

7. A method according to claim 1, wherein said container is heated by at least one heating element associated therewith.

8. Apparatus for determining the mass of fluid remaining in a container, said apparatus comprising means for heating said container, temperature sensor means for sensing the temperature of the container and any fluid contained therein, and processor means responsive to the output of said temperature sensor means for monitoring a temperature vs. time curve for the container and any fluid therein to deduce the thermal time constant of said curve and to determine the mass of fluid remaining using said thermal time constant.

9. A spacecraft including apparatus according to claim 8.

10. A spacecraft having a plurality of containers containing propellant fluid under pressure and each having associated therewith apparatus for determining the mass remaining therein, said apparatus comprising means for heating said container, temperature sensor means for sensing the temperature of the container and any fluid contained therein, and processor means responsive to the output of said temperature sensor means for monitoring a temperature vs. time curve for the container and any fluid therein to deduce the thermal time constant of said curve and to determine the mass of fluid remaining using said thermal time constant, wherein propellant fluid may be transferred from one container to another on the basis of the values obtained for the masses of propellant fluid remaining in the containers.

11. A method of determining the mass of fluid remaining in a container, which method comprises the steps of:

allowing the container to cool, detecting and measuring the temperature of the container and any fluid contained therein, deducing a temperature vs. time curve for the container and any fluid therein, devising from said curve the thermal time constant of said curve, and using said thermal time constant to determine the mass of fluid remaining in said container.

* * * * *